(12) United States Patent
Burgess et al.

(10) Patent No.: US 9,362,969 B1
(45) Date of Patent: Jun. 7, 2016

(54) ELECTRONIC DEVICE STAND FOR IMAGE ACQUISITION AND ANALYSIS

(71) Applicant: C1 Bank, St. Petersburg, FL (US)

(72) Inventors: Trevor Burgess, St. Petersburg, FL (US); Marcio deOliveira, Sarasota, FL (US)

(73) Assignee: C1 Bank, St. Petersburg, FL (US)

( * ) Notice: Subject to any disclaimer, the term of this patent is extended or adjusted under 35 U.S.C. 154(b) by 0 days.

(21) Appl. No.: 14/921,328

(22) Filed: Oct. 23, 2015

(51) Int. Cl.
 *H04M 1/00* (2006.01)
 *H04B 1/3877* (2015.01)
 *H04M 1/04* (2006.01)

(52) U.S. Cl.
 CPC .............. *H04B 1/3877* (2013.01); *H04M 1/04* (2013.01)

(58) Field of Classification Search
 None
 See application file for complete search history.

(56) References Cited

U.S. PATENT DOCUMENTS

| | | | |
|---|---|---|---|
| 7,232,098 B2 | 6/2007 | Rawlings et al. | |
| 7,290,740 B2 * | 11/2007 | Joy | B60R 11/00 248/166 |
| 8,177,175 B2 | 5/2012 | Chang | |
| D661,309 S | 6/2012 | Murrer et al. | |
| 8,616,508 B1 | 12/2013 | Coleman | |
| 2002/0056794 A1* | 5/2002 | Ibrahim | A47B 19/00 248/177.1 |
| 2003/0116628 A1 | 6/2003 | Nakazawa et al. | |
| 2003/0160138 A1 | 8/2003 | Rawlings et al. | |
| 2005/0040298 A1* | 2/2005 | Ohki | F16M 11/10 248/176.1 |
| 2005/0051683 A1* | 3/2005 | Young | G03B 37/02 248/187.1 |
| 2005/0243199 A1* | 11/2005 | Bohaker | H04N 1/00127 348/373 |
| 2012/0061180 A1* | 3/2012 | Phillips | A01M 31/02 182/129 |
| 2012/0223193 A1* | 9/2012 | Hurley | F16M 11/10 248/163.1 |
| 2012/0274842 A1* | 11/2012 | Cordes | H04N 7/142 348/373 |
| 2014/0036430 A1 | 2/2014 | Wroblewski et al. | |
| 2015/0227719 A1* | 8/2015 | Ranalletta | G06F 19/3462 141/83 |

FOREIGN PATENT DOCUMENTS

| | | |
|---|---|---|
| WO | 2012167675 A1 | 12/2012 |
| WO | 2014037463 A2 | 3/2014 |

* cited by examiner

*Primary Examiner* — Dominic Rego
(74) *Attorney, Agent, or Firm* — Jeffrey B. Fabian, Esq.; Shumaker, Loop & Kendrick, LLP

(57) ABSTRACT

A stand for an electronic device having a camera at one end, where the stand includes: an elongate base having a target end, a device end, a first side, and a second side; a tray disposed on a top surface of the target end adjacent to the first side of the base; a foot extending from the device end; and a device support extending upward from the base between the device end and the target end of the base. The device support has a height and a distance from the foot such that a camera of an electronic device can capture an image of an object or document located in the tray when the device is resting on the foot and the device support.

17 Claims, 9 Drawing Sheets

ELECTRONIC DEVICE STAND FOR IMAGE ACQUISITION AND ANALYSIS

TECHNICAL FIELD AND BACKGROUND

The present invention relates generally to the field of electronic device stands, and more particularly, to a device stand that allows users to stably support an electronic device while capturing document images for analysis and processing.

Use of portable electronic devices, such as cellular smartphones and tablet computers, has proliferated as individuals use these devices to perform an ever-increasing variety of tasks, including Internet browsing, sending and receiving emails and text messages, capturing photographic images and videos, and document editing and processing. Some applications, such as two-dimensional barcode scanning or optical character recognition, require users to capture photographic images of documents so that the images can be processed for information or reformatted and edited. It is often desirable to place the portable electronic device in an upright position to facilitate viewing, typing, and the capture of high-quality photographic images that can be reliably scanned and processed.

Accordingly, it is an object of the present invention to provide a portable electronic device stand that allows users to place the electronic device in a stable, upright position for convenient viewing and typing. It is a further object of the present invention to provide a stand that facilitates the acquisition of high-quality photographic images that can be reliably processed.

SUMMARY

According to one embodiment of the invention, an electronic device stand includes an elongate base with a target end, a device end, a first side, and a second side; a tray disposed on the top surface of the target end configured to hold an object; a foot extending from the device end; and a device support extending upward from the base between the target end and the device end of the base. The support has a height and a distance from the foot such that a camera of an electronic device can capture an image of an object in the tray when the device is in contact with the foot and the device support.

In one aspect of the invention, the device support can include a graded top surface as well as a lateral alignment member to secure the electronic device and facilitate optimal placement for reliable image capture and analysis. Other embodiments also include at least one base lateral alignment member extending upward from the base between the foot and the device support.

In one embodiment, the foot is formed from (i) a first wall extending outwardly from the device end of the base in substantially parallel relation to a longitudinal axis of the base and (ii) a second wall extending from the first wall in substantially perpendicular relation to the longitudinal axis of the base. The foot may also include a support plate extending between the device end of the base and the second wall of the foot.

In another aspect of the invention, the tray includes a lateral sidewall extending partially along a length of the target end in substantially parallel relation to a longitudinal axis of the base. The tray can also be formed with a transverse sidewall extending from the lateral sidewall in substantially perpendicular relation to the longitudinal axis of the base. The lateral and transverse sidewalls can form a recess. With other embodiments, the tray can be formed with a bottom surface that is raised relative to the top surface of the target end.

The tray can be formed from a nonslip material to facilitate stable placement of objects or documents in the tray. For some embodiments, the tray is sized to accommodate an identification card between three and four inches in length and two and three inches in width.

In yet another embodiment, the height of the device support and its distance from the foot are configured such that an electronic device rests on the stand at an angle between thirty-five and fifty degrees relative to the base. To make the stand adjustable, the first wall of the foot can be slidably attached to the base. In other embodiments, the first wall of the foot comprises a roller guide.

According to a further embodiment of the invention, the device support can include a lower wall extending between the first side and the second side of the base in substantially perpendicular relation to the device end and target end; a first and a second support rail extending upward from the lower wall; a top surface extending between the first and second support rails; and a plurality of intermediate support rails extending between a bottom side of the top surface and the lower wall of the device support.

Another embodiment of the stand includes one or more cutouts on the device support, target end, and device end. One cutout can be defined by an open space between the first and second sides of the base, the device support, and the device end of the base. Another cutout can be defined by an open space defined between the lower wall, the top surface, the first support rail, and an intermediate support rail.

BRIEF DESCRIPTION OF THE DRAWINGS

Features, aspects, and advantages of the present invention are better understood when the following detailed description of the invention is read with reference to the accompanying figures, in which.

DETAILED DESCRIPTION

Figure 1:
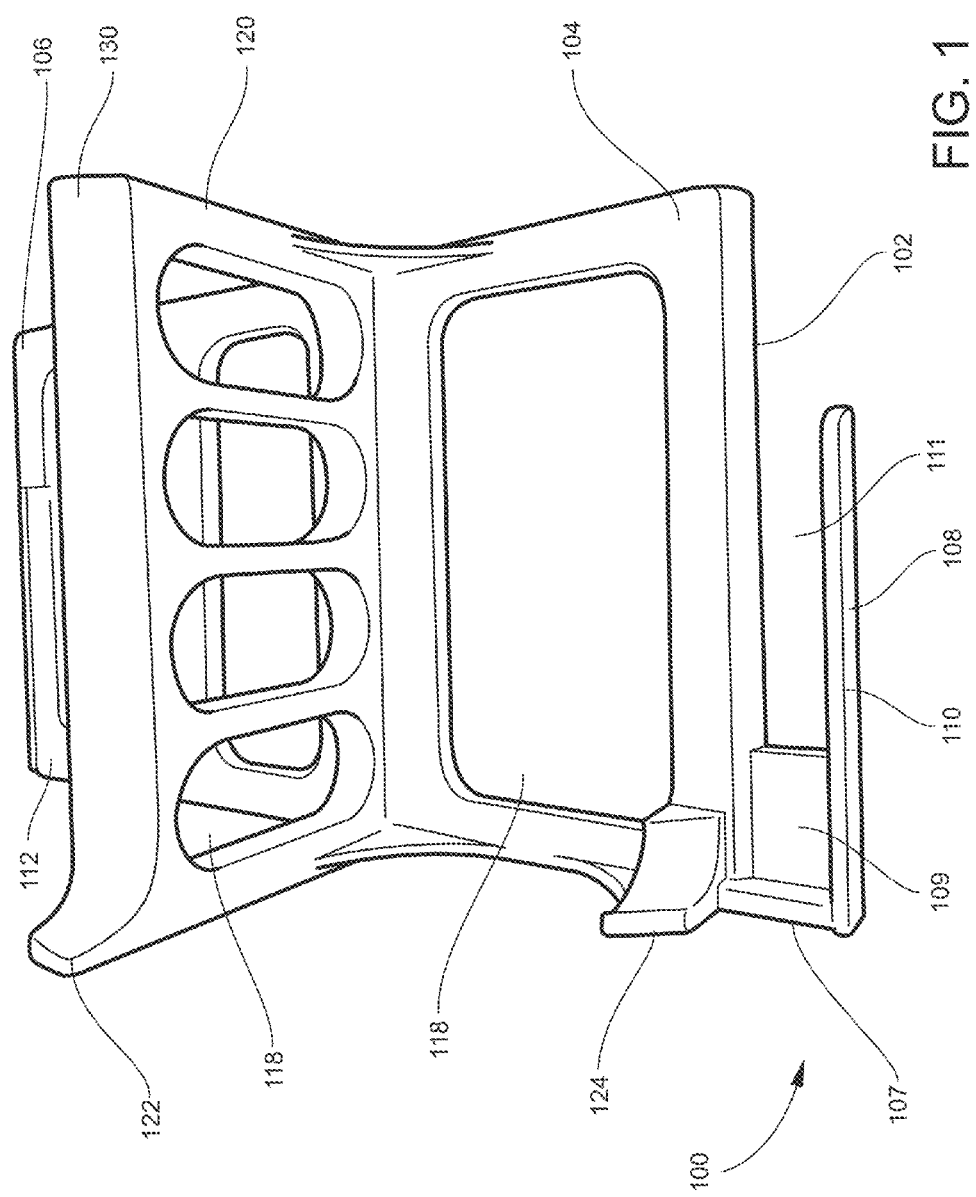
FIG. 1 is a top, perspective view of the device end of a device stand according to an embodiment of the invention.
Figure 2:
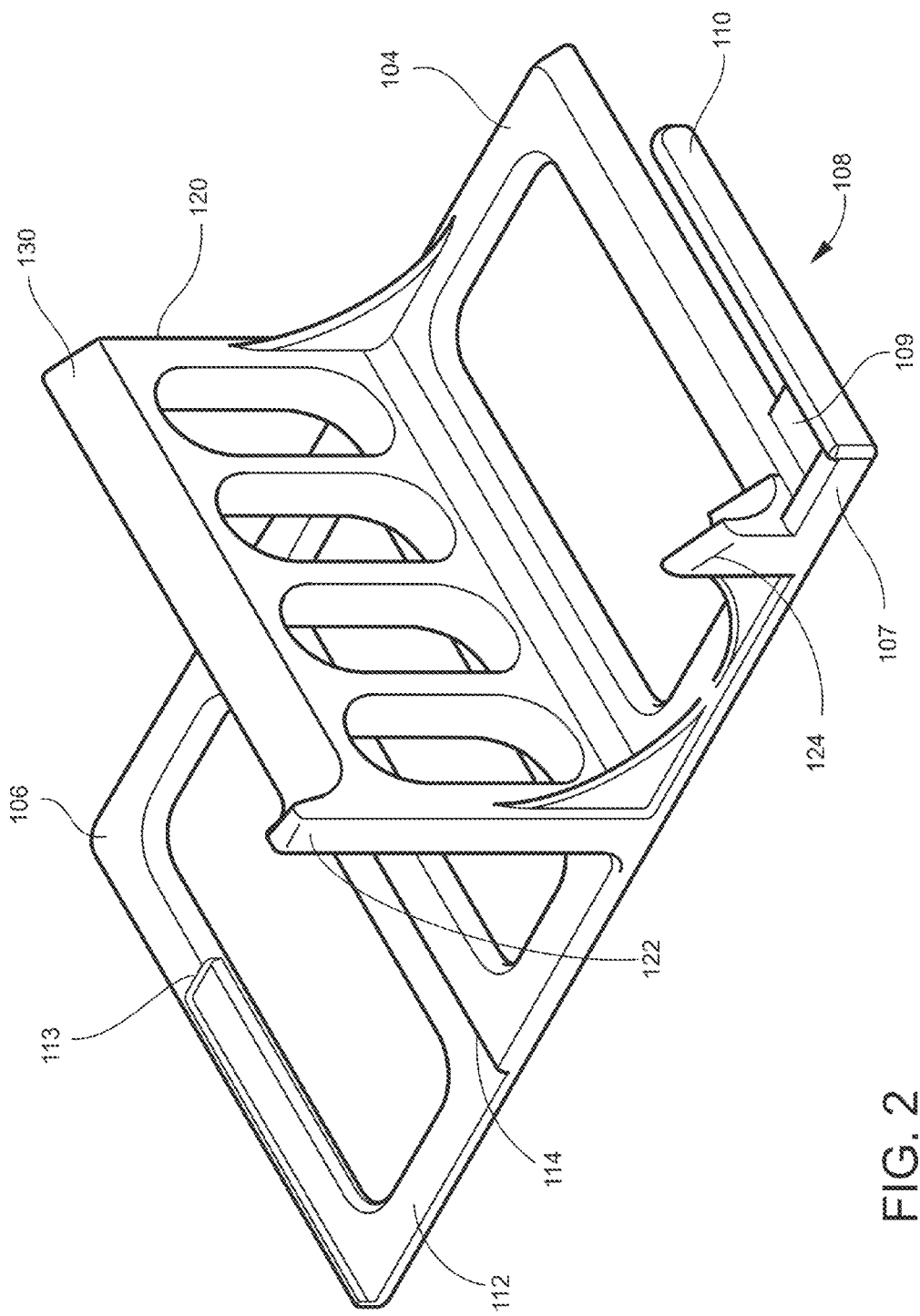
FIG. 2 is a top, perspective view of a device stand according to an embodiment of the invention.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention.

Relative terms such as lower or bottom; upper or top; upward, outward, or downward; and vertical or horizontal may be used herein to describe one element's relationship to another element illustrated in the figures. It will be understood that relative terms are intended to encompass different orientations of an electronic device stand in addition to the orientation depicted in the drawings. By way of example, if an electronic device stand in the drawings is turned over, elements described as being on the "bottom" of the other elements would then be oriented on "top" of the other elements. Relative terminology, such as "substantially" or "about," describe the specified materials, steps, parameters, or ranges as well as those that do not materially affect the basic and novel characteristics of the claimed inventions as whole (as would be appreciated by one of ordinary skill in the art).

As used herein, the term document refers generally to any writings, images, or other expressions fixed in a tangible medium that is sufficiently permanent or stable to permit the document to be perceived, reproduced, or otherwise communicated for a period of more than transitory duration. The term user describes an individual who utilizes the device stand of the present invention to view an electronic device display and/or to capture and analyze document images. The term user is used interchangeably with the terms consumer, person, or individual. Wherever used herein, the masculine shall be deemed to include the feminine, and the feminine shall be deemed to include the masculine.

Disclosed herein is an electronic device stand for viewing and interacting with an electronic device display as well as capturing and processing document images. The electronic device can be any type of suitable device, including, for example, a cellular phone, a tablet computer, or a laptop computer. The electronic device can also be an application-specific device, such as a media player, word-processing device, consumer terminal, or barcode reader. The electronic device can include a screen and one or more buttons, among other features. The screen can be a touch screen that includes a tactile interface. Although the embodiments described herein are described with reference to capturing and analyzing barcode images from government-issued identification cards, those of ordinary skill in the art will appreciate that the device stand can be used to view and capture images of documents generally.

With reference to FIG. 1, a device stand 100 according to one embodiment of the invention generally includes a base 102 with a top surface, a bottom surface, a device end 104, and a target end 106; a tray 112 disposed on the top surface of the base target end 106; a foot 108 extending outward from the base device end 104; a device support 120 extending upward from the base 102 and defining the base device end 104 and target end 106; one or more device support lateral alignment members 122; and one or more base lateral alignment members 124.

The base 102 shown in the attached figures is formed as a substantially flat frame with cutouts 118 to reduce weight and manufacturing costs. The length and width of the base 102 should be sized so as to stably support an electronic device, like the tablet computer shown in FIGS. 5-7. In one embodiment, the length and width of the base device end 104 are both between two and a half and ten inches to accommodate mobile electronic device displays of various sizes. The length and width of the target end 106 can be sized independently from the device end 104 but should be sufficient to provide adequate support and optimal positioning of documents for imaging and processing, as discussed in more detail below.

Figure 5:
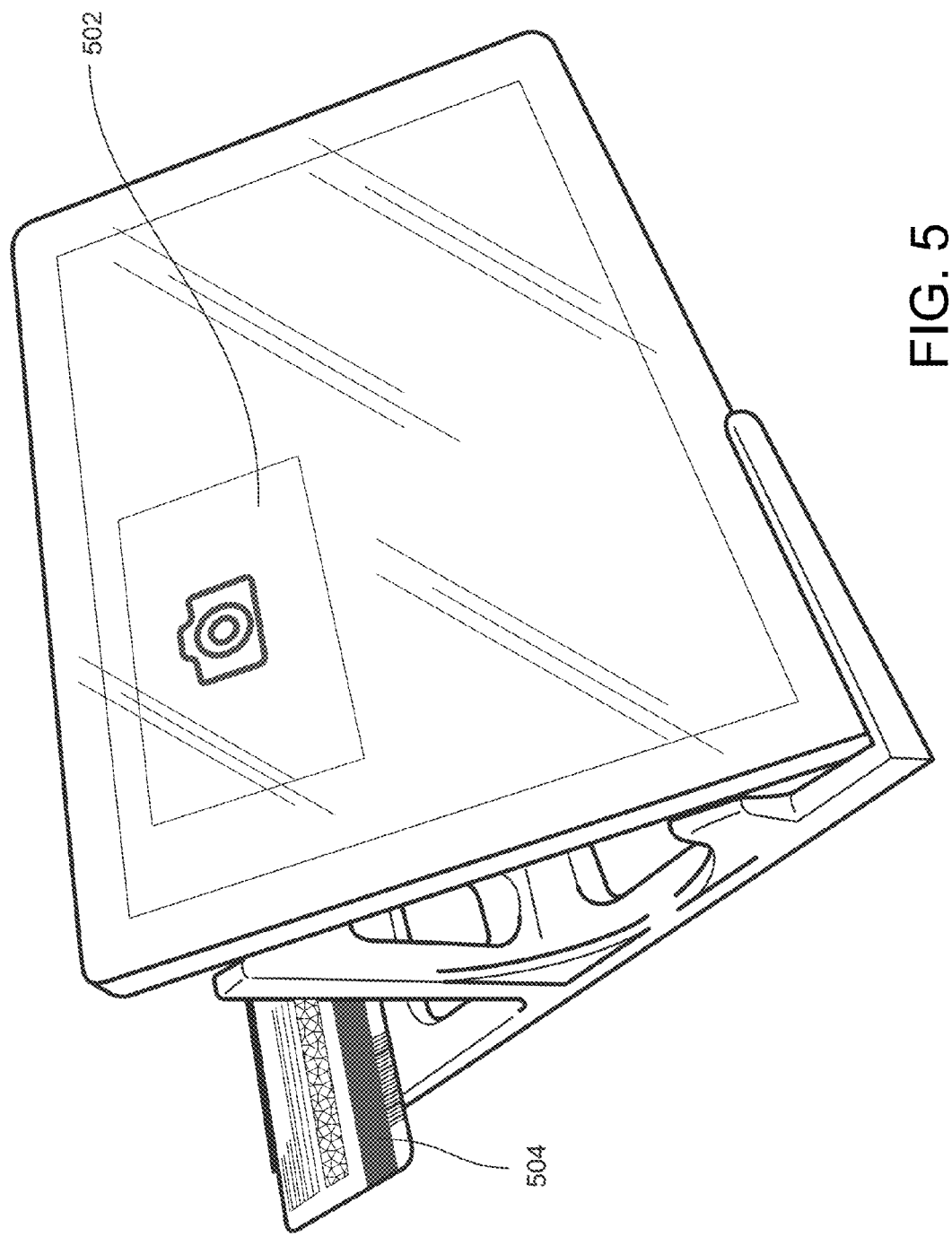
FIG. 5 illustrates a document image capture utilizing a device stand according to an embodiment of the invention.
Figure 6:
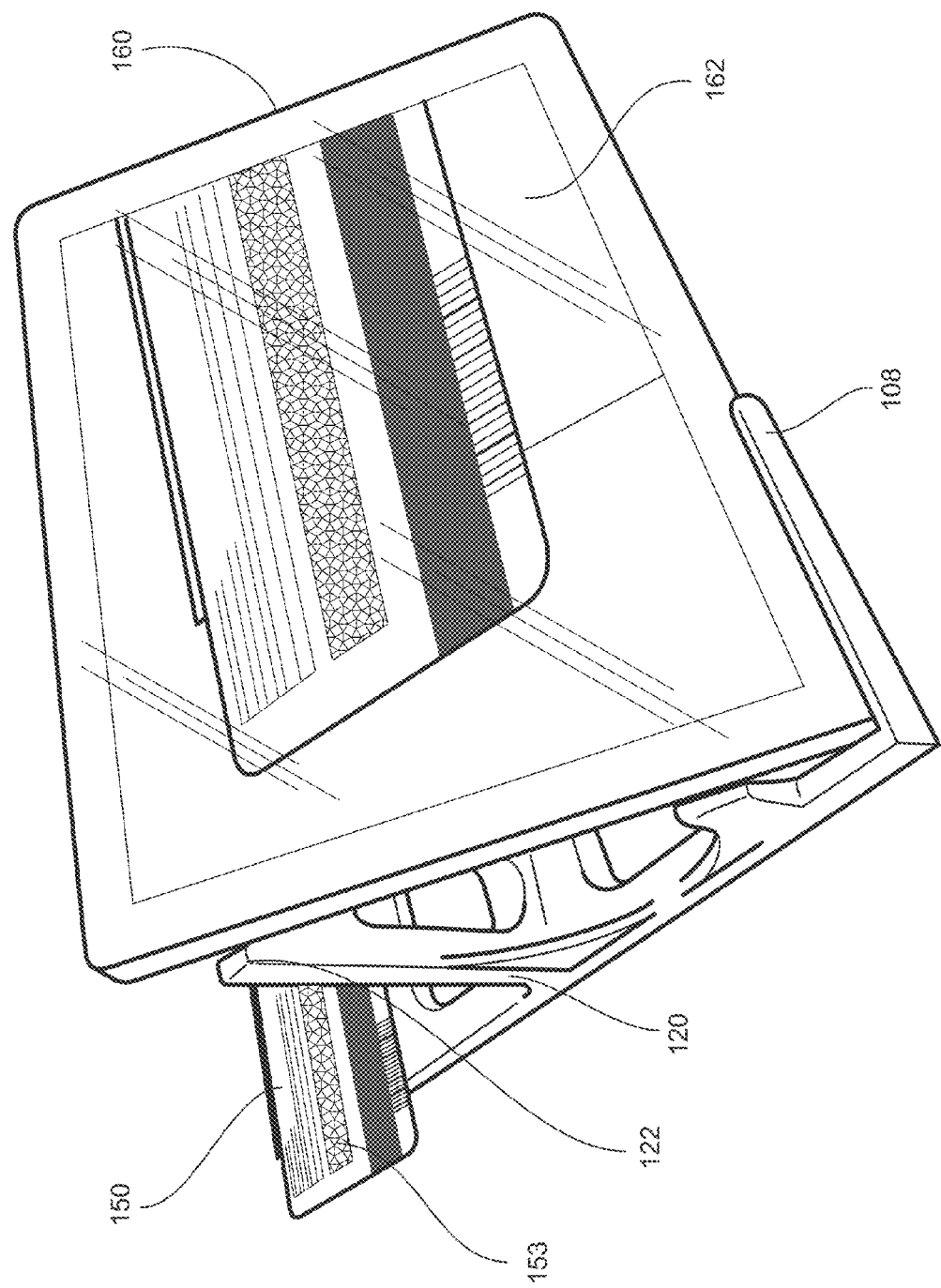
FIG. 6 illustrates a document image capture utilizing a device stand according to an embodiment of the invention.

The device end 104 includes a foot 108 that extends outward from the base 102 and supports the side edge of an electronic device, as shown in FIGS. 5-6. The foot 108 includes a first wall 107 that extends outward substantially parallel (e.g., within about twenty-five degrees) to the longitudinal axis of the base device end 104, and a second wall 110 that extends from the first wall 107 in substantially perpendicular relation (e.g., within about twenty-five degrees) to the longitudinal axis of the base device end 104. The height of the foot 108 in the embodiment shown in the attached figures is between approximately one-eighth of an inch to one half of an inch or greater to accommodate the thickness of various electronic devices.

The foot 108 further includes an edge plate 109 on which the electronic device rests when being supported by the device stand 100. Thus, the electronic device rests entirely on the device stand 100 and does not contact the surface on which the device stand 100 sits, thereby avoiding unnecessary friction forces between the electronic device and the support surface if the device stand 100 is moved. Although the foot 108 shown in the attached figures extends substantially parallel to a longitudinal axis of the base 102, the foot 108 can also be configured to extend upward or downward at an angle relative to the base 102. The space between the foot 108 and the base device end 104 defines a slot 111 that accommodates a computing device cover, which slides and rests underneath the base 102, as shown in FIG. 5.

The base target end 106 of the embodiments shown in the attached figures includes a tray 112 formed as a recess on the top surface of the target end 106 with one lateral sidewall 113 substantially parallel (e.g., within about twenty-five degrees) to a longitudinal axis of the base 102, and a transverse sidewall 114 extending substantially perpendicular (e.g., within about twenty-five degrees) to the longitudinal axis of the base. The tray 112 is sized to accommodate an identification card about three and a half inches long by two inches wide. The tray 112 can optionally be made of a nonslip surface to facilitate immobilization of the target document for reliable image capture and processing. The tray 112 and surrounding target end 106 can be colored to distinguish the target document from the surrounding surface. For example, if the target documents are generally white, the tray 112 and target end 106 can be colored a dark shade to set the target document apart in any resulting image.

Those of ordinary skill in the art will appreciate that the tray 112 embodiment depicted in the attached figures is not intended to be limited. The tray 112 can be configured to secure documents and objects of different sizes. For instance, the tray 112 can be sized to secure standard eight and a half by eleven inch sheets of paper. Or if the device stand 100 is being used to scan barcodes in an inventory management system, the tray can be configured to accommodate the packaging for particular type of inventory item that will be scanned on a regular basis. Rather than a recess, the tray 112 can also be formed as a raised surface on the device end 104 with optional sidewalls to secure a document in place.

The device support 120 extends upward from the base 102 and has a graded top surface 130 that seats the back of an electronic device resting at an angle on the device stand 100, as illustrated in FIGS. 5-6. Similar to the base 102, the device support 120 includes one or more cutouts 118 to reduce device weight and manufacturing costs.

One or more device support lateral alignment members 122 are disposed on the graded top surface 130, and one or more base lateral alignment members 124 are disposed on the base device end 104 to secure the electronic device and facilitate optimal placement for reliable image capture and analysis. The alignment members 122 and 124 are formed as protrusions extending upward from a first side of the graded top surface 130 or first side of the base device end 104.

The alignment members 122 and 124 have an arcuate, graded shape that contacts an electronic device supported by the device support 120. Although the arcuate shape accommodates many types of electronic devices that generally have rounded sidewall edges, any suitable type of surface can be used, such as squared or angular shapes. The device support 120 can optionally include additional lateral alignment members, such as a second alignment member at an end of the graded top surface 130 opposite the first end. Likewise, the base device end 104 can optionally include additional lateral alignment members, such as a second alignment member on a side of the base device end 104 opposite the first side.

Figure 8A:
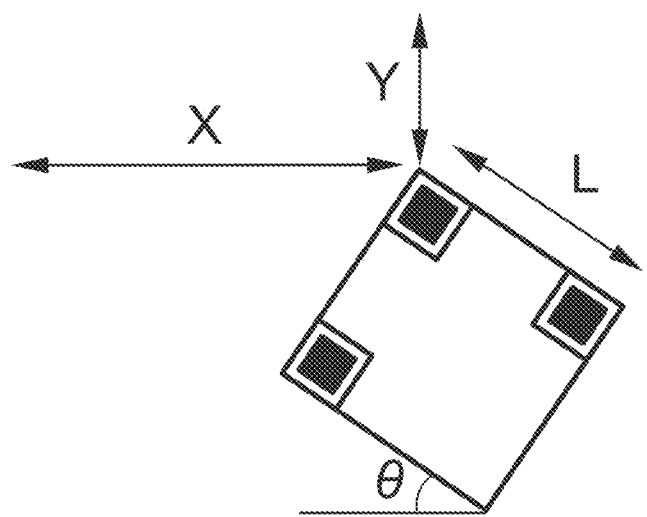
FIGS. 8a-b illustrate distortion of images taken at an angle.
Figure 8B:

Image processing techniques, like optical character recognition ("OCR") and barcode scanning, analyze the intensity, positioning, and spacing of pixels in a digital image to recognize and extract data from the image. If a photographic image of a document is taken at an angle, the pixel size and spacing may appear misaligned, as illustrated in FIG. 8a, or distorted, as in FIG. 8b. In that instance, the image processing may fail or yield inaccurate data.

Imaging processing techniques can compensate for misaligned or distorted image features. But the compensation is more efficient and reliable, and thus the extracted data is more accurate, if the misalignment or distortion is repeatable and predictable and if the photographic image is captured at an optimal range of angles. As a result, it is desirable to capture photographic images of a target document in a repeatable manner by, for example, capturing the photographic images of documents at a predetermined angle or range of angles.

Figure 3:
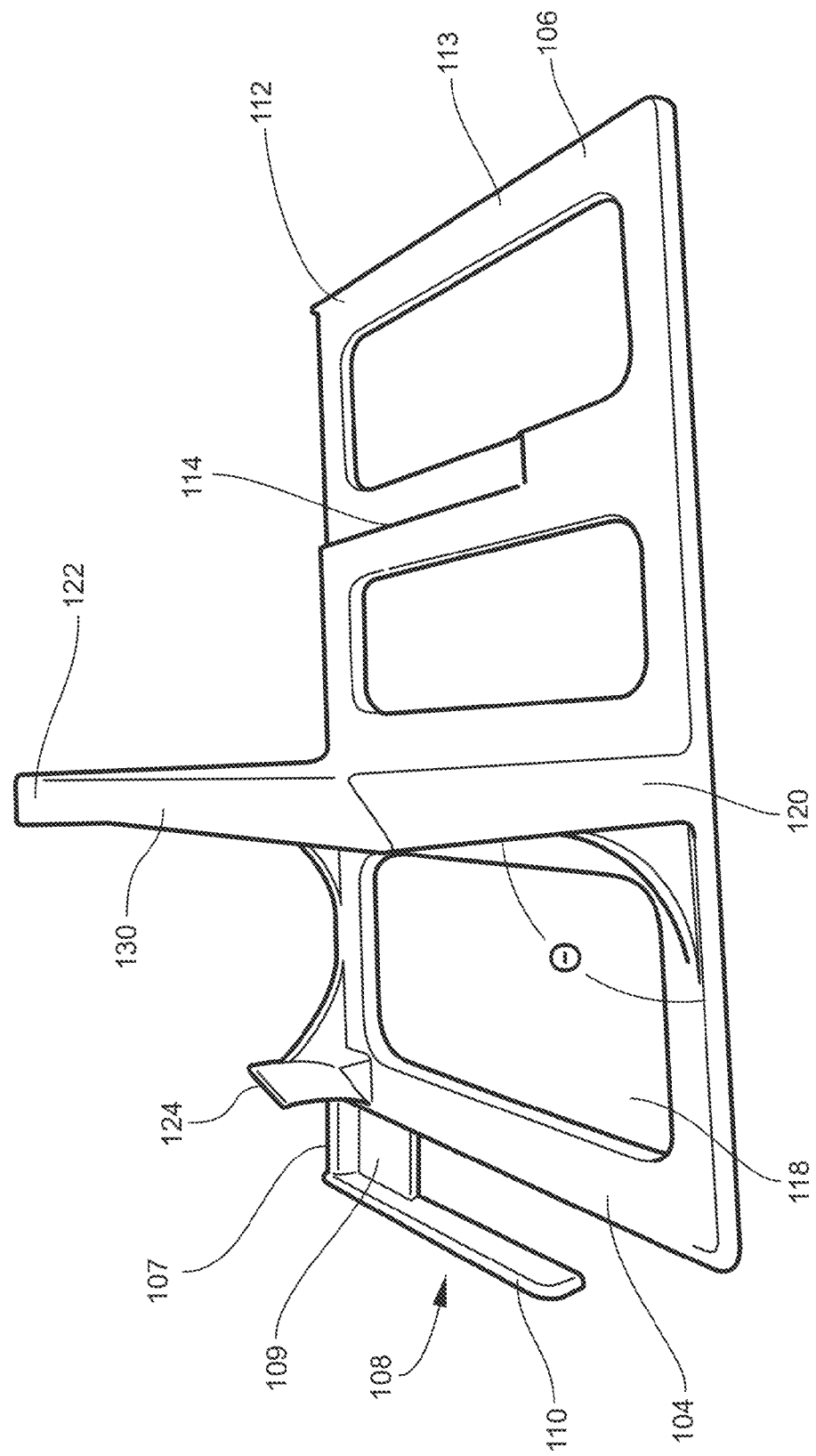
FIG. 3 is a side view of a device stand according to an embodiment of the invention.
Figure 4:
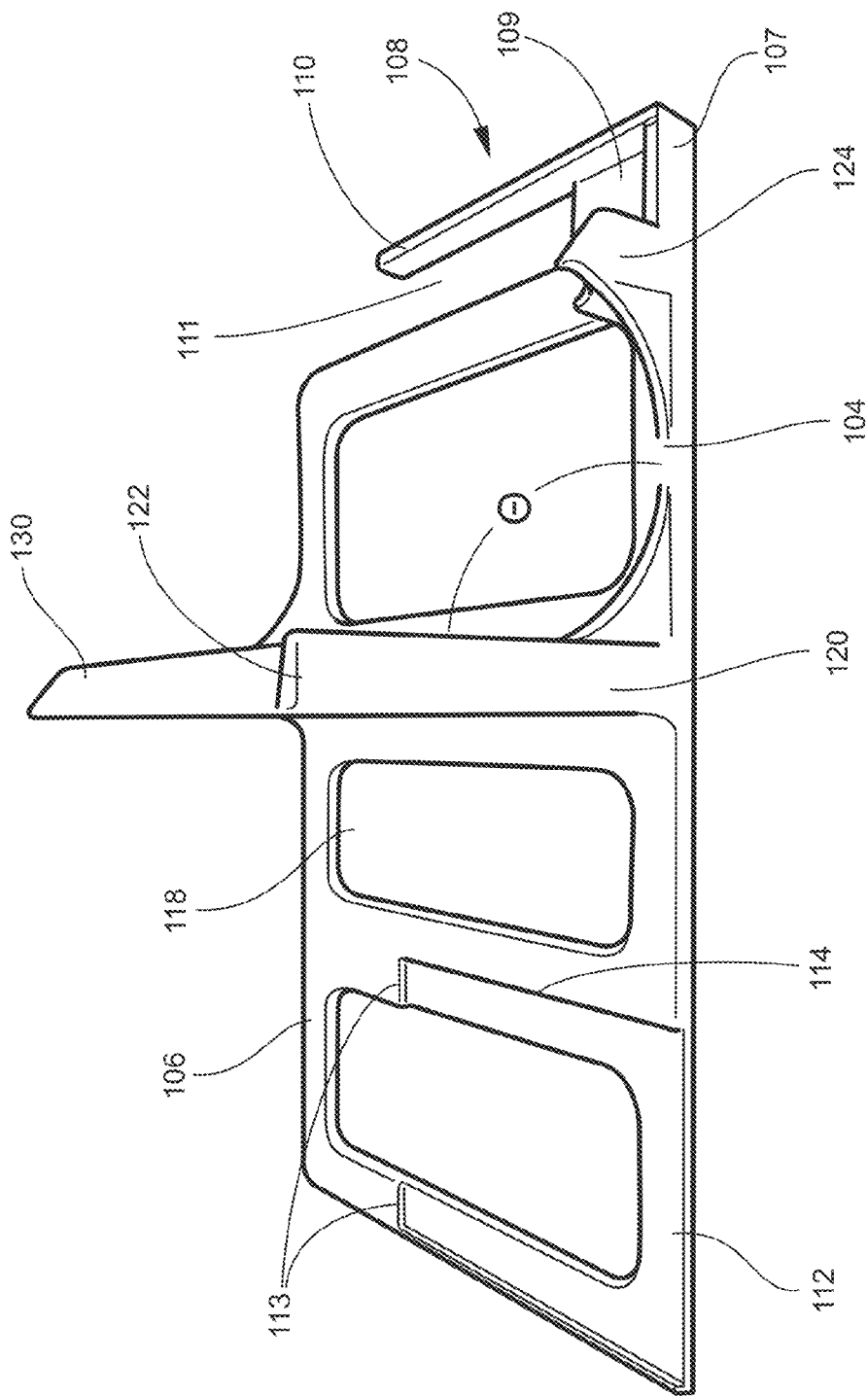
FIG. 4 is a side view of a device stand according to an embodiment of the invention.

In the present invention, the foot 108 length, the device support 120 height, the device end 104 length, and the tray 112 position are configured so that photographic images of target documents are captured at repeatable and optimal angles for the type of electronic device used and the type of target document to be imaged. The angle of the photographic image is determined in part based on the angle at which the electronic device sits relative to the base 102, which is shown as the angle θ in FIGS. 3-4. The angle θ is dependent on the device support 120 height, the length of the device end 104, and the length of the foot 108. In one embodiment, the dimensions are selected such that the angle θ is approximately between thirty-five and fifty-five degrees. The embodiment shown in the attached figures has an angle θ of approximately forty to forty-two degrees.

The angle of the photograph is also affected by the position of the tray 112 on the surface of the base target end 106 relative to location of the electronic device camera lens. Preferably, the camera lens is approximately laterally aligned with the tray 112 position as, for instance, in FIGS. 5 and 6 where the tray 112 and camera lens are positioned at an end of electronic device stand corresponding to the lateral alignment member 122. The tray 112 is located a distance along the length of the base target end 106 so that the tray 112 is approximately centered in the field of view of the camera, as depicted in FIG. 6.

Figure 9:
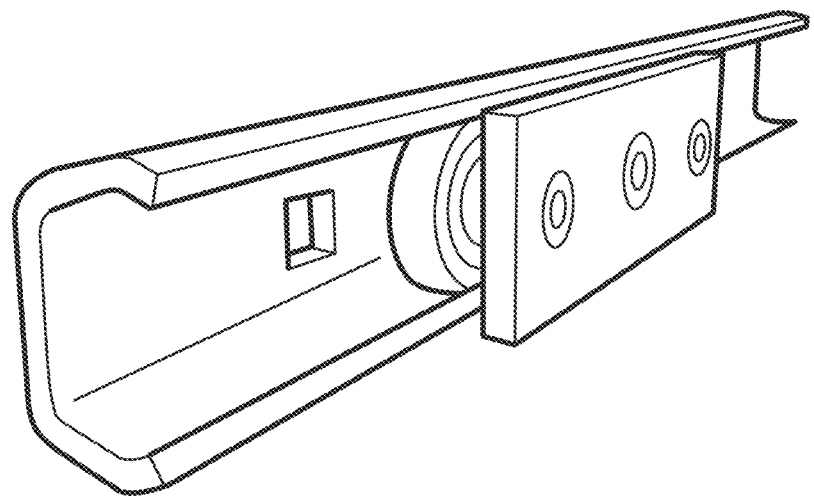
FIG. 9 is an exemplary sliding track adjustment mechanism.
Figure 10:
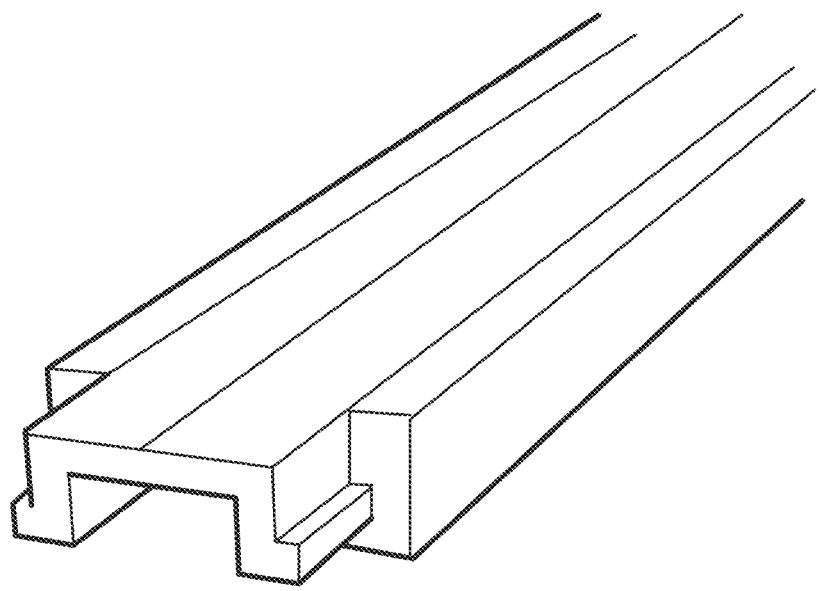
FIG. 10 is an exemplary T-bar track adjustment mechanism.

The device stand 100 can be configured to accommodate electronic devices and target documents of varying dimensions by making the angle θ adjustable. The angle θ is varied by, for instance, adjusting the foot 108 length, the device support 120 height, or the angle of the device support 120 relative to the base 102. Any suitable mechanism can be used to adjust the foot 108 length and device support 120 height. As an example, the foot 108 and/or device support 120 can be mounted to the base 102 using a sliding track mechanism, such as the roller guide shown in FIG. 9 or the T-bar and T-track shown in FIG. 10, or a threaded fastener adjustment screw. The angle of the device support 120 relative to the base 102 can be adjusted by, for instance, mounting the device support 120 to the base 102 using a rotating hinge mechanism.

Figure 7:
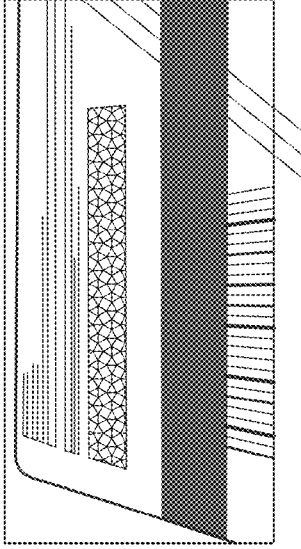
FIG. 7 illustrates the extraction of document image data using a device stand according to an embodiment of the invention.

Operation of the device stand is illustrated in FIGS. 5-7. A user places an electronic device in the device stand with a sidewall edge resting against the foot 108 and the back surface of the electronic device resting on the graded top surface 130 of the device support 120. The target document is positioned in the tray 112. A user selects the "Photograph" function 502 shown in FIG. 5 to capture a photographic image of the target document 504, which in this case is a two-dimensional barcode located on an identification card. The photographic image is displayed to the user for review and approval, shown in FIG. 6. A software application integrated with the electronic device processes the image, extracts the relevant information, and populates necessary data fields, which is illustrated in the text boxes on FIG. 7.

The device stand 100 components can be made of any sufficiently rigid material, such as clays, ceramics, glasses, metals, polymers, plastics, rubbers, or combinations thereof. One or more surfaces of the device stand, including those surfaces where additional friction would be advantageous, like the tray 112, base bottom surface, foot 108, plate 109, device support top surface 130, or lateral supports 122 and 124, can be formed from a nonslip material, such as rubber, silicone elastomer, vinyl, or neoprene. The nonslip surfaces can also be formed as textured surface with bumps, grooves, protrusions, ridges, serrations, splines, or a combination thereof. In one embodiment, the nonslip surface utilizes synthetic *setae* made from polymers like polyimide, polypropylene, and polydimethylsiloxane.

Components of the device stand 100 can be coupled and/or integrated together in any known manner, such as by adhesives or chemical bonds. Further, the device stand 100 may be manufactured using any known method, such as by blowing, casting, extruding, forging, machining, molding, stamping, three-dimensional printing, chemical vapor deposition, or combinations of such methods.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A stand for an electronic device having a camera at one end thereof, the stand comprising:
    (a) an elongate base having a target end, a device end, a first side, and a second side;
    (b) a tray disposed on a top surface of the target end adjacent to the first side of the base;
    (c) a foot extending from the device end; and
    (d) a device support extending upward from the base between the target end and the device end of the base, the device support having a height and a distance from the foot such that a camera of a device can capture an image of an object in the tray when the device is in contact with the foot and the device support.

2. The stand of claim 1, wherein the device support further comprises a graded top surface and a lateral alignment member disposed at a first side thereof.

3. The stand of claim 2, wherein the height of the device support and the distance from the foot are configured such that the device rests on the stand at an angle between thirty-five and fifty degrees relative to the base.

4. The stand of claim 1, wherein the device end further comprises at least one base lateral alignment member extending upward therefrom between the foot and the device support.

5. The stand of claim 1, wherein the foot comprises:
   (a) a first wall extending outwardly from the device end of the base substantially parallel to a longitudinal axis thereof; and
   (b) a second wall extending from the first wall in perpendicular relation to the longitudinal axis of the base.

6. The stand of claim 5, wherein the foot further comprises a support plate extending between the device end of the base to the second wall of the foot adjacent to the first wall and extending for at least a portion of the length of the second wall.

7. The stand of claim 6, further comprising an open space defined by the first and second sides of the base, device support, and the device end of the base.

8. The stand of claim 5, wherein the first wall of the foot is slidably attached to the base.

9. The stand of claim 8, wherein the first wall of the foot comprises a roller guide.

10. The stand of claim 1, wherein the tray comprises a lateral sidewall extending partially along a length of the target end in substantially parallel relation to a longitudinal axis of the base.

11. The stand of claim 10, wherein the tray further comprises a transverse sidewall extending from the lateral sidewall in substantially perpendicular relation to the longitudinal axis of the base, and wherein the lateral and transverse sidewalls form a recess.

12. The stand of claim 11, wherein the tray further comprises a raised bottom surface relative to the top surface of the target end.

13. The stand of claim 11, wherein the tray comprises a nonslip material.

14. The stand of claim 11, wherein the tray is sized to accommodate an identification card between three and four inches in length and two and three inches in width.

15. The stand of claim 1 further comprising one or more cutouts on the device support, target end, and device end.

16. The stand of claim 1, wherein the device support comprises:
   (a) a lower wall extending between the first side and the second side of the base in substantially perpendicular relation to the device end and target end thereof;
   (b) a first and a second support rail extending upward from the lower wall;
   (c) a top surface extending between the first and second support rails; and
   (d) a plurality of intermediate support rails extending between a bottom side of the top surface and the lower wall of the device support.

17. The stand of claim 16, further comprising an open space defined by the lower wall, the top surface, the first support rail, and an intermediate support rail.

* * * * *